United States Patent [19]
Bohnert et al.

[11] Patent Number: 5,550,341
[45] Date of Patent: Aug. 27, 1996

[54] SWITCH MOUNTABLE TO A PANEL WITHOUT ADDITIONAL FASTENERS

[75] Inventors: Larry J. Bohnert, Monroe, Wis.; Richard R. Ellis; Michael G. Marchini, both of Freeport, Ill.

[73] Assignee: Honeywell Inc., Minneapolis, Mich.

[21] Appl. No.: 489,192

[22] Filed: Jun. 9, 1995

[51] Int. Cl.$^6$ .................................................. H01H 9/02
[52] U.S. Cl. .................................... 200/296; 200/331
[58] Field of Search ................................ 200/296, 293, 200/303, 283.1, 284, 573, 331, 43.14, 43.22; 174/52.1, 50, 52.2, 53, 54

[56] References Cited

U.S. PATENT DOCUMENTS

| | | |
|---|---|---|
| 1,960,020 | 5/1984 | McGall . |
| 4,227,238 | 10/1980 | Saito ........................................ 200/296 |
| 5,128,828 | 7/1992 | Mrenna et al. ......................... 200/296 |

Primary Examiner—David J. Walczak
Attorney, Agent, or Firm—William D. Lanyi

[57] ABSTRACT

A switch is specifically shaped to be retained in position within an apparatus, such as a household appliance, by inserting edges of an opening formed in the sheet material of the apparatus into first and second slots shaped into the housing of the switch. The first and second slots can be formed in opposite edge surfaces of the switch housing structure, either within the flat edges or at the corners of the housing structure. When attached to an appliance, no screws or other fasteners are necessary to rigidly attach the switch to the apparatus. The switch can be pushed into a slot formed in an edge of one panel of the apparatus and then captivated by an opening in another panel of the apparatus. Alternatively, the switch can be inserted into a larger portion of a single opening and then moved into a narrower portion of that opening. Another device can then be inserted into the larger portion of the opening to prevent inadvertent removal of the switch from its attached position within the opening.

8 Claims, 12 Drawing Sheets

5,550,341

SWITCH MOUNTABLE TO A PANEL WITHOUT ADDITIONAL FASTENERS

BACKGROUND OF THE INVENTION

1. Field of the Invention

The present invention relates generally to switches that are attached to an apparatus and, more specifically, to a switch that has a housing which is particularly shaped to mate with a first opening in a thin plate so that the switch can be attached to the apparatus without the need for additional screws or other fasteners.

2. Description of the Prior Art

Many types of snap switches have been known to those skilled in the art for many years. One of the earliest snap switches is described in U.S. Pat. No. 1,960,020, which issued to McGall on May 22, 1934. The McGall patent describes improvements in snap switches that are formed of thin leaf springs. The snap switch described in the McGall patent consists of a contact arm that is operatively mounted so that its free end moves between two stop positions. The contact arm comprises a thin leaf spring operatively supported at one end in cantilever fashion, the other end being free to move, in combination with adjacent parallel compressed spring means attached to the free end of the thin leaf spring.

Most switches comprise a housing that is provided with one or more holes to permit the attachment of the spring to an external device. The McGall patent described above provides two holes through the housing structure of a switch for this purpose. Mounting a switch to an apparatus in this matter, with screws or other fasteners that extend through openings in a switch housing, requires the expenditure of time and money that increases the total costs of the apparatus with which the switch is associated. For example, if a household appliance, such as a dishwasher, washing machine or clothes dryer, requires the use of a switch that is screwed or bolted to the frame of the appliance, the total cost of the appliance is increased by the inclusion of the bolts or screws and the time required for an operator to assemble the switch to the frame of the appliance. It would therefore be significantly beneficial if a means could be provided to simplify the attachment of a switch to an apparatus and eliminate the need for the use of screws or other fasteners to attach the switch to the appliance.

SUMMARY OF THE INVENTION

The present invention relates to an apparatus that comprises a switch having a housing structure. The housing structure has a top major surface, a bottom major surface and at least a first edge surface and a second edge surface. Although it is recognized that most switch housings are parallelepipeds which have two major planar surfaces connected together by four edge surfaces, the present invention, in a preferred embodiment utilizes only two edge surfaces for its purposes.

A first slot is formed in the housing structure extending through the top major surface, the bottom major surface and a first edge surface. A second slot is formed in the housing structure extending through the top major surface, the bottom major surface and a second edge surface.

The present invention further comprises a first panel of the apparatus which has a first opening that is shaped to receive the switch therein. The first panel is made of a sheet material having a first thickness. The first and second slots of the housing structure are sized to receive the first thickness of the sheet material at first and second edges of the first opening in the first panel. In addition, a means is provided for rigidly maintaining the switch within the first opening of the first panel and a means is provided for actuating the switch in response to movement of a component of the apparatus. In an application of the present invention, the switch is actuated in response to movement of a door or lid of the apparatus. For example, if a door or lid of a clothes dryer is to be monitored by the switch, movement of the door will actuate the switch.

The first and second edge surfaces of the housing structure can be parallel to each other and located at opposite ends of the switch. Alternatively, the first and second edges of the housing structure can be opposite corners of the structure. In a most common application of the present invention, the sheet material is sheet metal and the apparatus is a household appliance, such as a dishwasher, washing machine or clothes dryer. The maintaining means can comprise a second panel of the apparatus which has a second opening formed therethrough. The second opening is shaped to receive the housing structure of the switch therein and prevent the housing structure of the switch from moving out of the first opening after the first and second panels are assembled together. In this type of application of the present invention, the first panel can be a side panel of the appliance and the second panel can be the front panel of the appliance.

In certain applications of the present invention, the maintaining means can comprise a portion of an actuating means. This type of embodiment of the present invention is most typical when the switch is disposed in an opening of a first panel that does not extend through an edge of the panel and requires an opening which has sufficient clearance in one dimension to permit the switch to be inserted into the opening and then moved into attachment relation with the opening. In order to prevent the switch from moving back out of the confining portion of the first opening, the actuating means can be designed to prevent the movement of the switch housing out of the first opening.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
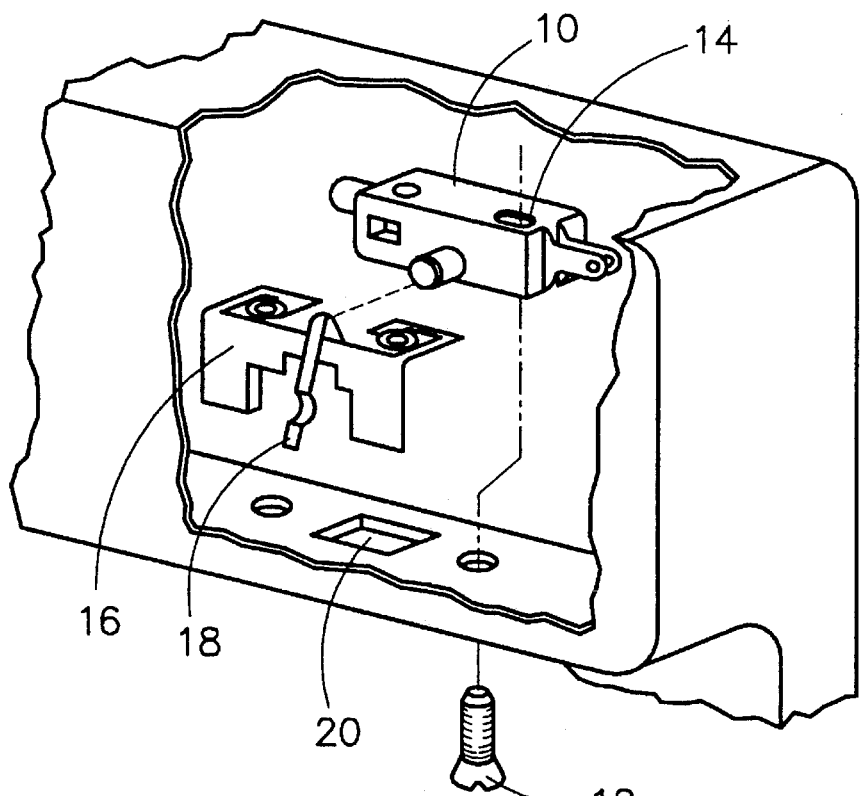
FIG. 1 shows a known assembly of a switch and an actuator within a control panel of an appliance.
Figure 2:
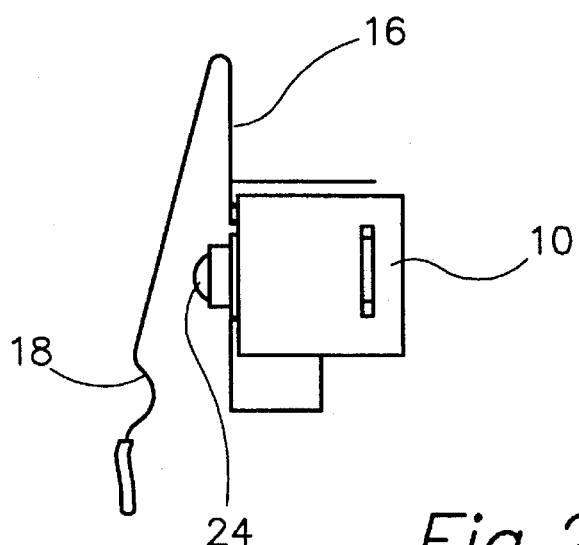
FIG. 2 is a side view of the switch and actuator shown in FIG. 1.

Throughout the Description of the Preferred Embodiment, like components will be identified by like reference numerals. FIG. 1 illustrates a portion of a panel of an apparatus, such as a clothes dryer, dishwasher or washing machine. The illustration of FIG. 1 is sectioned to show the internal portion of a control panel where a switch 10 is mounted so that the movement of a door can be monitored. The switch 10 is rigidly attached to the control panel by one or more screws 12 that extend into or through openings 14 in the switch housing. An actuator 16 is also attached to the control panel and an arm 18 of the actuator extends downward through a hole 20 for the purpose of responding to the closure of a door that moves the arm 18. FIG. 2 shows the actuator 16 associated with the switch 10 in such a way that the arm 18 can be pushed against the switch actuator 24 in response to the closure of the door described above.

With reference to FIGS. 1 and 2, it can be seen that, during the assembly of the appliance, an operator must place the switch 10 at an appropriate position relative to the clearance holes, on both sides of hole 20, and then insert at least one screw 12 through the clearance hole and into the opening 14 which is formed through the housing of the switch 10. In most applications, two screws are needed to properly attach the switch 10 to the appliance. This procedure, which is well known to those skilled in the art and commonly practiced in the attachment of switches to apparatus, requires the provision of two screws and, in addition, requires an operator to take the time to properly locate the screws and drive them into or through the switch housing. The cost of materials, which include the screws, and the time to assemble the switch to the appliance with the screws add to the total cost of the appliance. It would therefore be beneficial if the assembly procedure could be simplified by redesigning the switch housing in such a way that the provision of screws or other fasteners is eliminated and the time to assemble the switch to the apparatus is reduced.

Figure 3A:
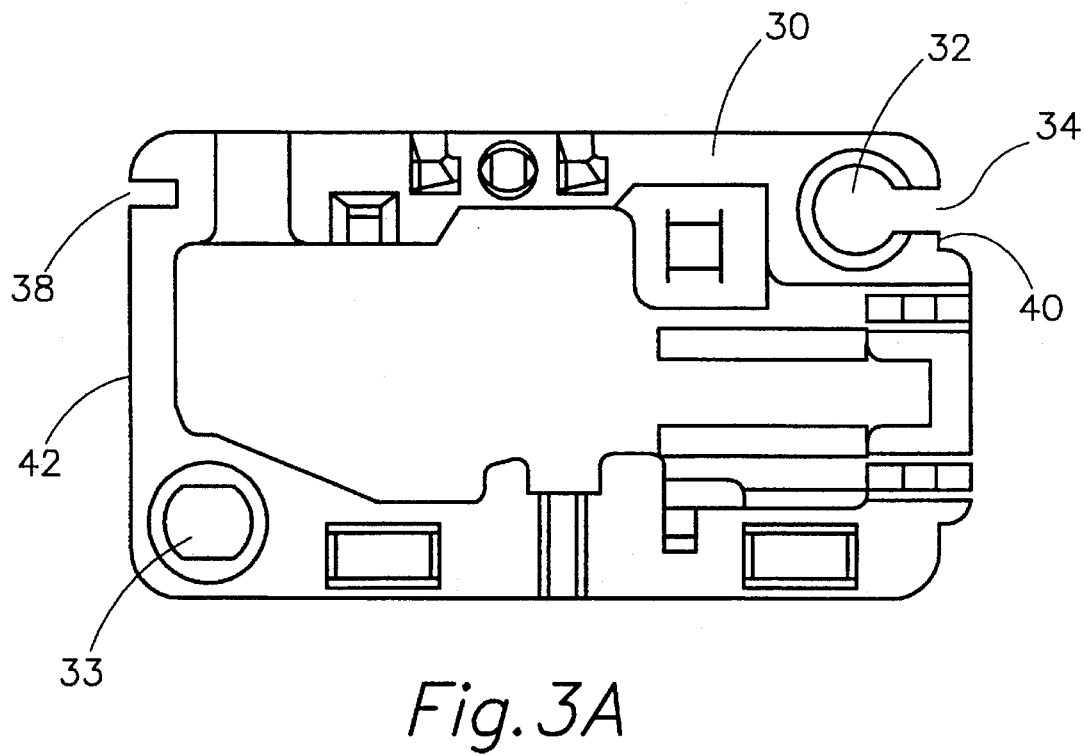
FIGS. 3A, 3B and 3C illustrate a modification to a switch housing structure in accordance with a first preferred embodiment of the present invention.
Figure 3B:
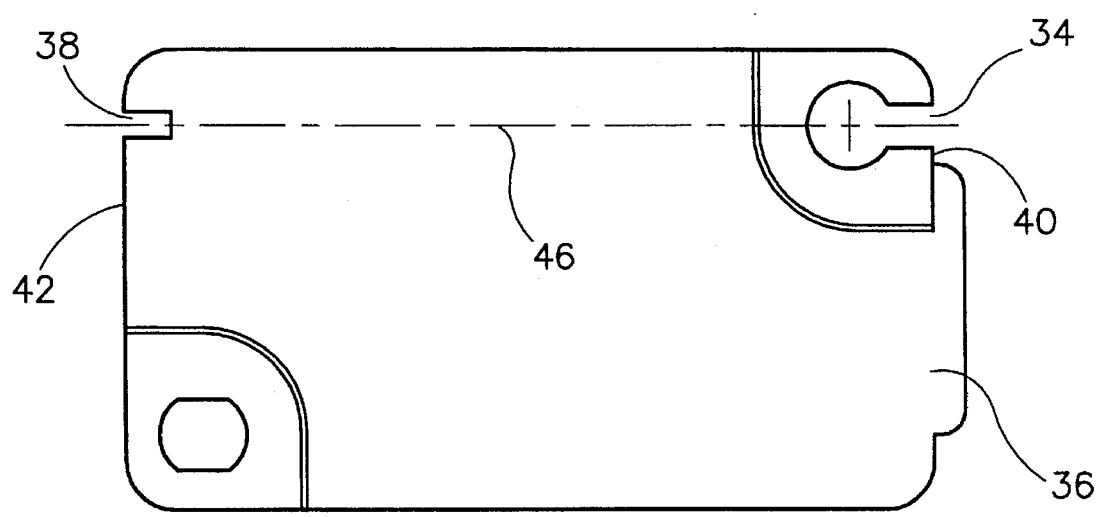

FIG. 3A shows a bottom portion of a housing structure 30 with the cover removed. Two mounting holes, 32 and 33, are provided through the housing structure. The present invention provides a housing structure that has a first slot 34 extending through its thickness. FIG. 3B shows the cover of the housing structure with the first slot 34. For purposes of the Description of the Preferred Embodiment, the top surface 36 of the switch housing structure will be considered to be a top major surface and the bottom surface of the housing structure 30 (not visible in FIGS. 3A and 3B) will be considered to be the bottom major surface. When the bottom portion and cover of the housing structure are assembled together, the switch housing has the shape of a parallelepiped with four edge surfaces connecting the top major surface to the bottom major surface.

With continued reference to FIGS. 3A and 3B, a second slot 38 is formed through the top and bottom major surfaces of the housing structure 30. The first slot also extends through a first edge surface 40 and the second slot 38 extends through a second edge surface 42. It should be understood that none of the surfaces of the housing structure are typically perfectly flat. To the contrary, many of the surfaces of the housing structure have bosses, embossed lettering or offset protrusions extending from them.

Figure 4A:
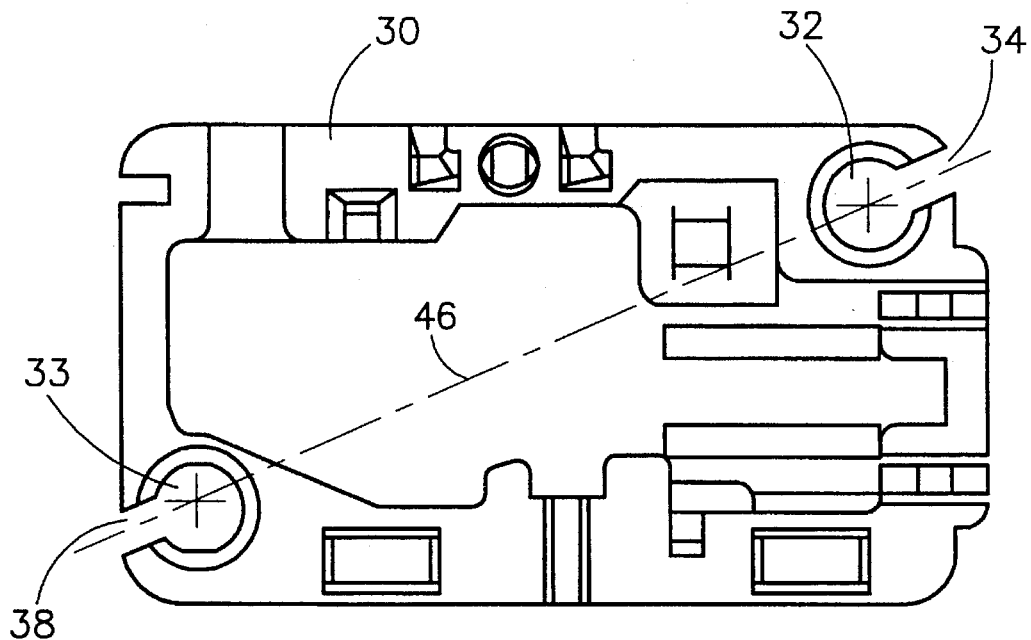
FIGS. 4A, 4B and 4C show modifications to a switch housing structure in accordance with a second preferred embodiment of the present invention.
Figure 4B:
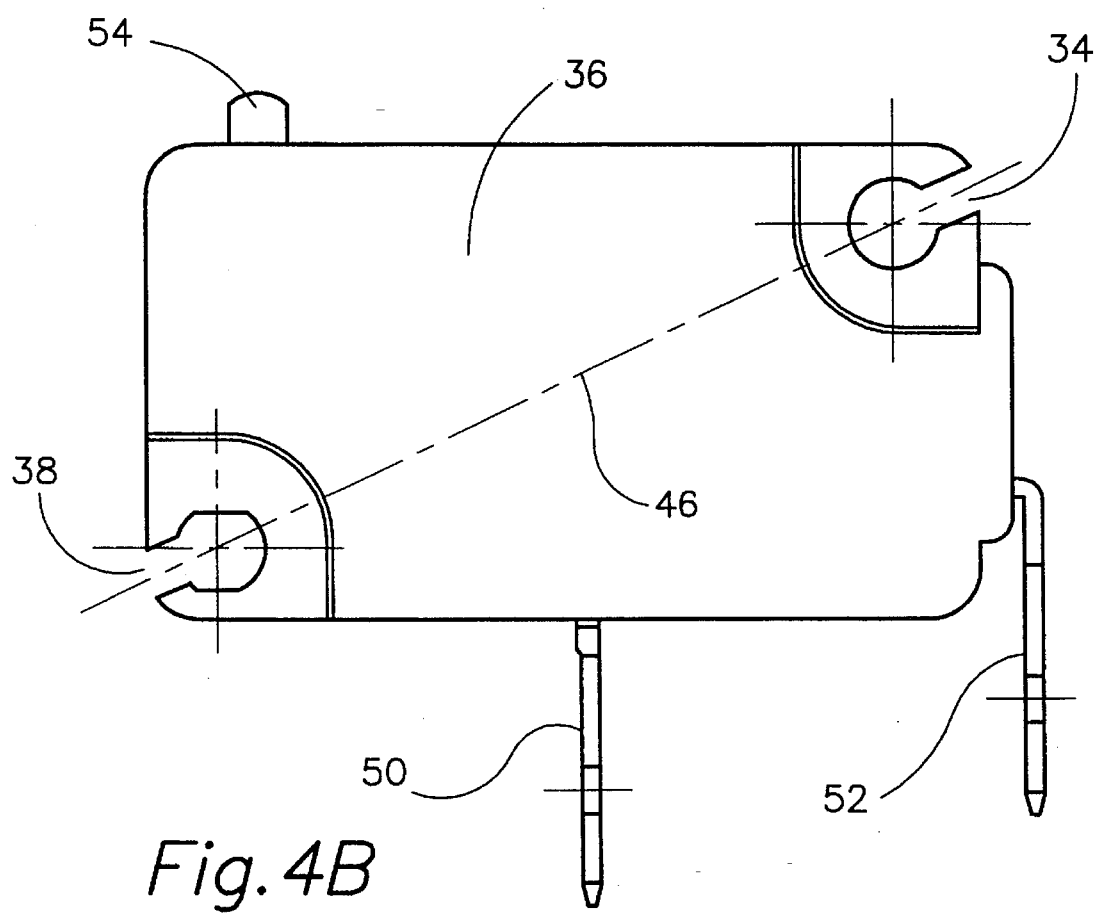

FIG. 4A shows an alternative embodiment of the present invention that modifies the housing structure 30 in a slightly different way. Beginning with the same basic housing structure 30 as described above in conjunction with FIG. 3A, the first slot 34 is formed proximate a first corner of the housing structure and the second slot 38 is formed proximate an opposite corner. In this case, the first slot 34 extends through the top and bottom major surfaces and through a first edge which is near the corner of the switch housing while the second slot 38 extends through the top and bottom major surfaces of the switch housing and through a second edge surface that is proximate an opposite corner of the switch. Line 46 shows the alignment of the first and second slots in FIGS. 4A and 4B. The embodiment of the present invention described in conjunction with FIGS. 3A and 3B has a similar alignment line 46 as shown in FIG. 3B. FIG. 4B shows the cover assembled to the bottom portion of the housing structure and, in addition, it shows electrical leads, 50 and 52, and an actuator 54 extending from the switch. It should be understood that the shapes and positions of the leads, 50 and 52, are not limiting to the present invention and can extend from the housing structure in any one of several directions and with several different configurations.

FIGS. 3A, 3B, 4A and 4B are intended to show the relative positions of the first and second slots that are formed in the housing structure. Two different embodiments are illustrated in conjunction with the figures described immediately above. A first embodiment places the first and second slots on opposite sides of the housing structure and extending through opposite edge surfaces, 40 and 42. Another embodiment, described in conjunction with FIGS. 4A and 4B, place the first and second slots more proximate the corners of the housing structure. Regardless of the specific location of the first and second slots, the basic principles and advantages of the present invention are similar.

Figure 3C:
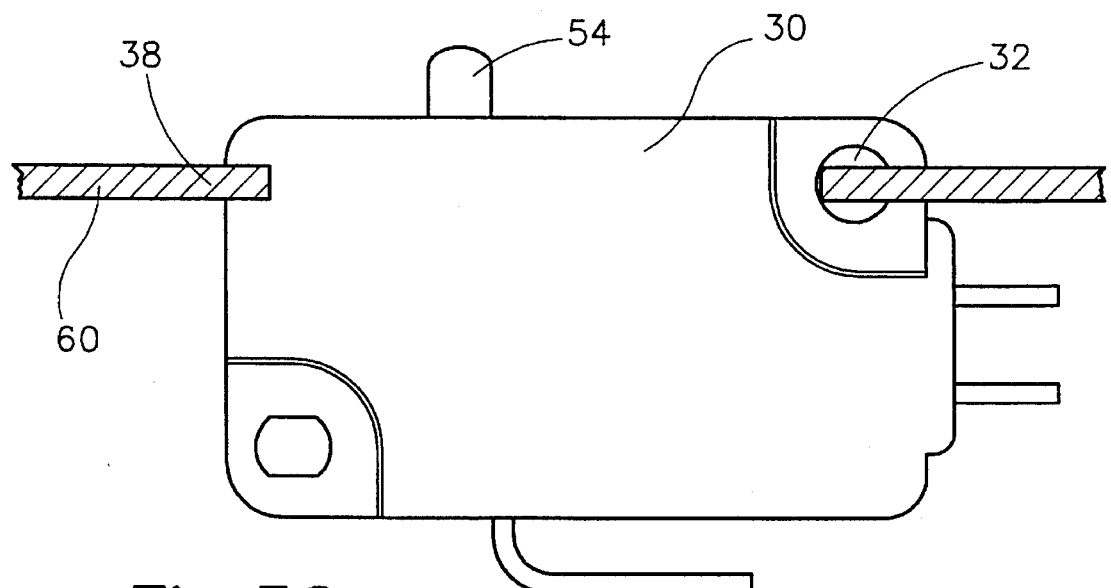

FIG. 3C shows the assembled switch made in accordance with the embodiment described above in conjunction with FIGS. 3A and 3B. The slots, 34 and 38, are fitted around edges of a sheet material 60. As will be described in greater detail below, the switch 30 can be assembled to a first panel that is made of sheet material 60 by sliding the switch 30 into a first opening so that the thickness of the sheet material 60 fits into the first and second slots, 34 and 38. In a particularly preferred embodiment of the present invention, the first and second slots are sized to receive the thickness of the sheet material 60 with a slight interference fit.

Figure 4C:
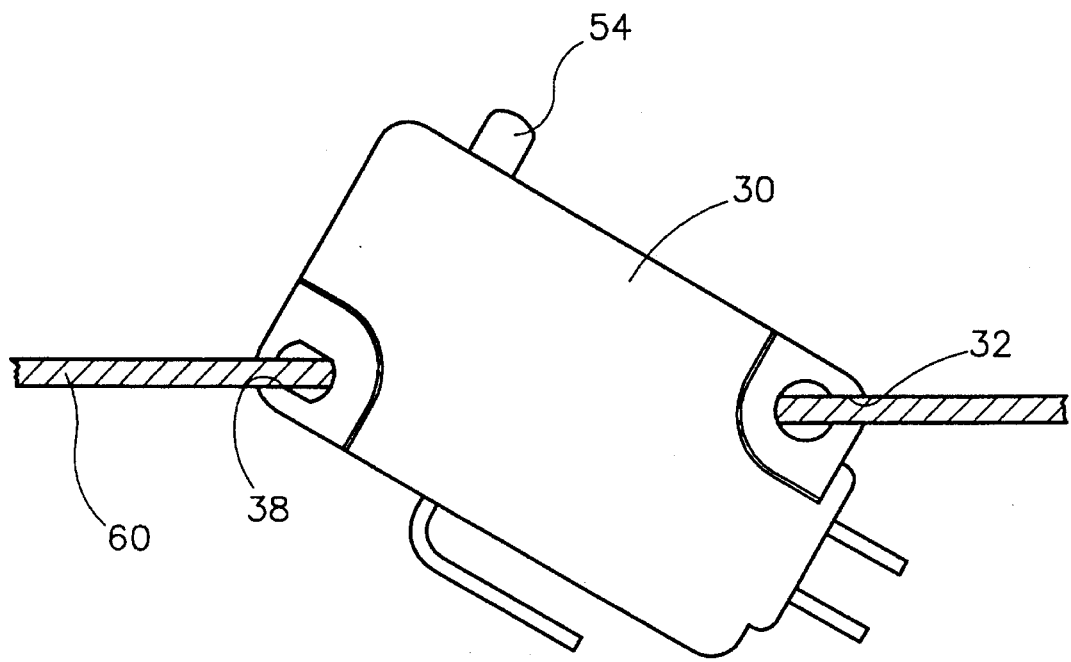

FIG. 4C shows the switch 30 made in accordance with the embodiment of the present invention described in FIGS. 4A and 4C. The switch 30 is attached to a piece of sheet material 60 with the thickness of the sheet material 60 placed in the first and second slots. As can be seen in FIGS. 3C and 4C, the basic concept of modifying the housing structure to include the first and second slots is similar in application of both embodiments of the present invention.

Figure 5:
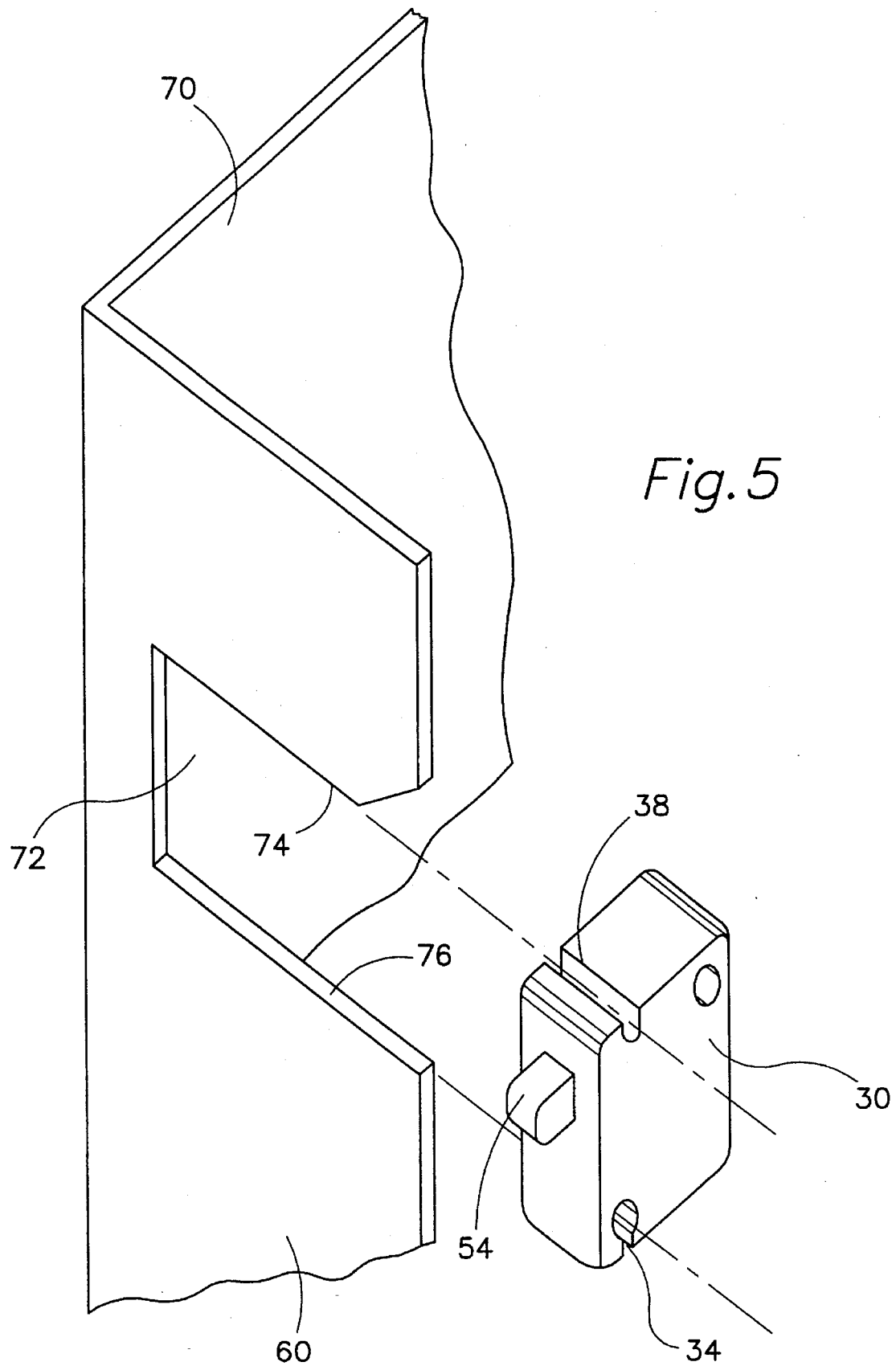
FIG. 5 is an exploded view of a first panel and a switch housing.

FIG. 5 shows one possible configuration of sheet material 60 that is shaped to form a first panel 70. The first panel 70, in this example, is a side panel of a household appliance such as a clothes dryer. The first panel 70 has a first opening 72 that has first and second edges, 74 and 76, respectively. A switch 30 is shown displaced from the first opening 72 for purposes of the illustration. If the switch 30 is moved into the first opening 72, the first edge 74 will be received by the first slot 34 and the second edge 76 will be received by the second slot 38. As shown in FIG. 5, the first edge 74 of the first opening 72 is slightly chamfered to facilitate the assembly of the switch 30 into the first opening 72.

Figure 6:
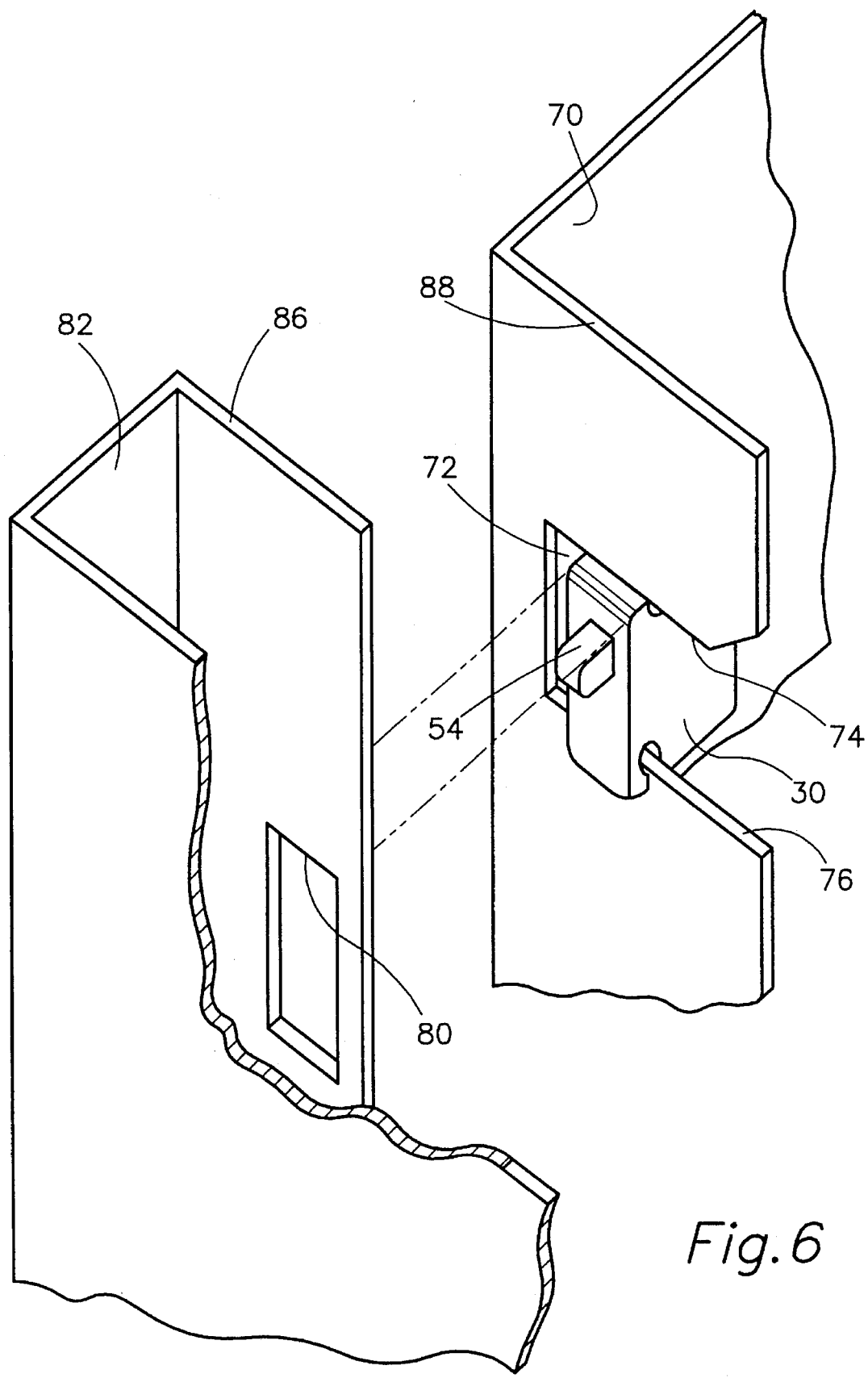
FIG. 6 shows the first panel and switch housing of FIG. 5 assembled together and spaced apart from a second panel prior to assembly therewith.

FIG. 6 shows the switch 30 pushed into position within the first opening 72 with the first and second edges, 74 and 76, of the first opening 72 being disposed in the first and second slots of the switch housing structure. This relationship between the first and second slots and the first and second edges of the first opening 72 retains the switch 30 in position, but does not restrain the switch from moving back out of the first opening in the opposite direction to which it was inserted into the opening. In order to rigidly maintain the switch at its proper position within the first opening 72, one embodiment of the present invention provides a second opening 80 formed in a second panel 82 that is also made of a sheet material. When the portion 86 of the second panel 82 is moved into contact with portion 88 of the first panel 70, the most proximate surface of the switch 30 will be disposed within the second opening 80. Since the second opening 80 has four edges disposed around the body of the switch 30, it will prevent movement of the switch 30 and therefore rigidly maintain the switch within both the first and second openings, 72 and 80. In one particular embodiment of the present invention, the second panel 82 is the front panel of a household appliance such as a clothes dryer.

Figure 7:
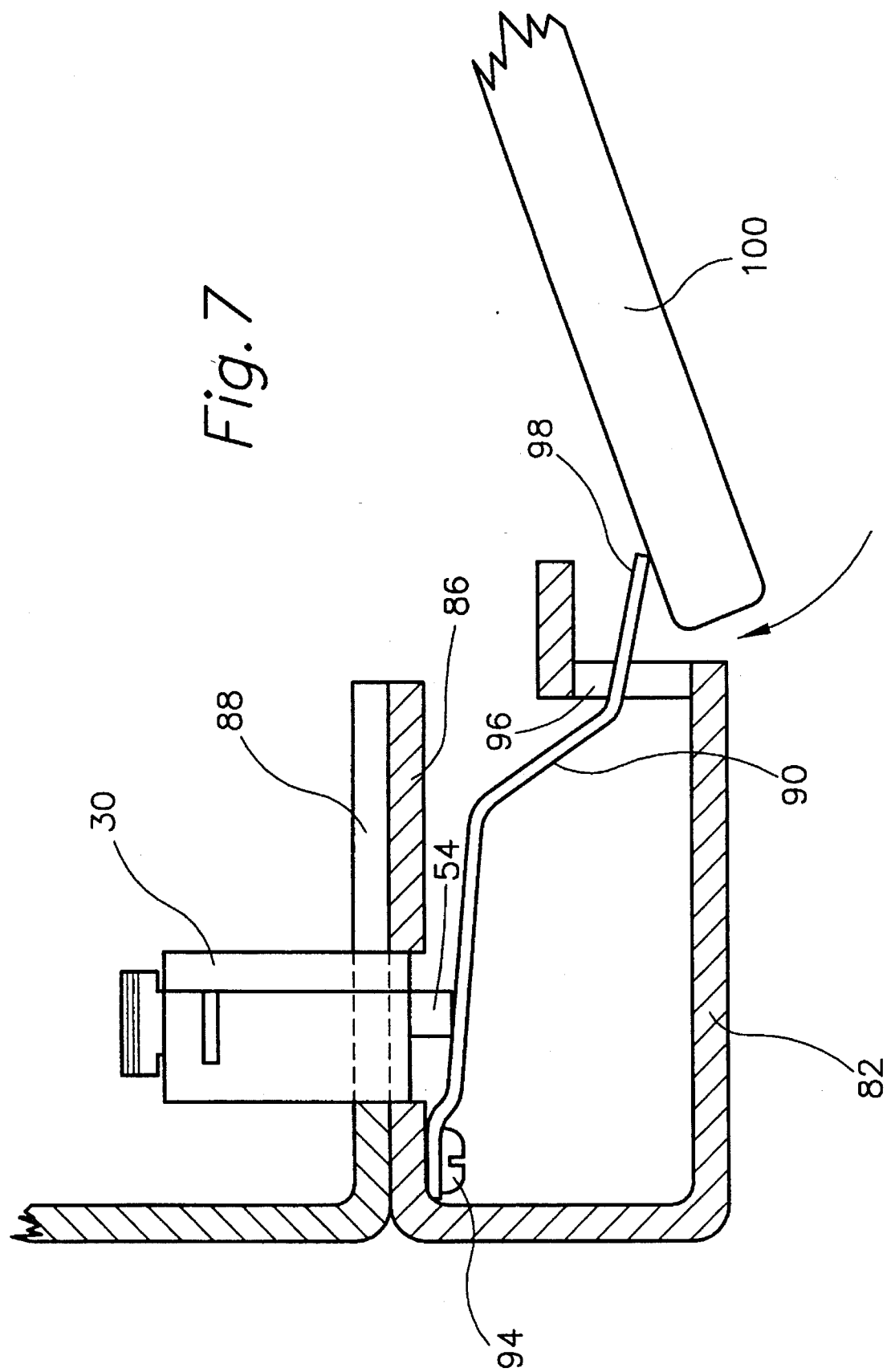
FIG. 7 is a top sectional view of the structure shown in FIG. 6 after assembly.

FIG. 7 shows a top sectioned view of the apparatus described above in conjunction with FIGS. 5 and 6. The switch 30 is retained in position by the cooperative association of the first and second openings, 72 and 80. In addition, the switch 30 extends through portions 86 and 88 of the two panels so that the actuator 54 of the switch is accessible by an actuating means 90. It should be understood that FIG. 7 is a highly simplified exemplary illustration of a means for actuating the switch. The precise shape and operation of the actuating means 90 can change significantly from one application of the present invention to another and is not limiting to the present invention. In the simplified schematic representation shown in FIG. 7, the actuating means 90 is attached to the second panel 82 by a screw 94. It extends through a hole 96 so that its distal end 98 protrudes into a door opening of the appliance. When a door 100 moves into a closed position as indicated by the arrow, it will push the distal end 98 of the actuating means 90 and that movement will cause the actuator 54 to be depressed into the switch 30. This will actuate the switch and denote closure of the door 100.

As can be seen from the discussion above in conjunction with FIGS. 5, 6 and 7, the switch 30 can be assembled rigidly in association with an apparatus without the need for any fasteners, such as screws. During assembly, an operator would merely need to slide the switch 30 into the first opening 72 of the first panel 70 to a predetermined position. The suggested interference fit between the first and second slots and the first and second edges of the first opening 72 will hold the switch in that proper position until the second panel 82 is assembled to the first panel 70. When this occurs, the second opening 80 is disposed around the protruding portion of the switch 30 that extends above the surface of portion 88 of the first panel. This rigidly maintains the switch in its position without the need for screws or other types of fasteners. Since the second panel 82 must be attached to the first panel 70 during the normal assembly procedure of the apparatus, no additional effort is required by the operator except to make sure that the second opening 80 is disposed at its proper position which will surround the switch 30. No additional hardware is required to attach the switch to the first and second panels and the assembly time required by an operator is very brief.

Figure 8:
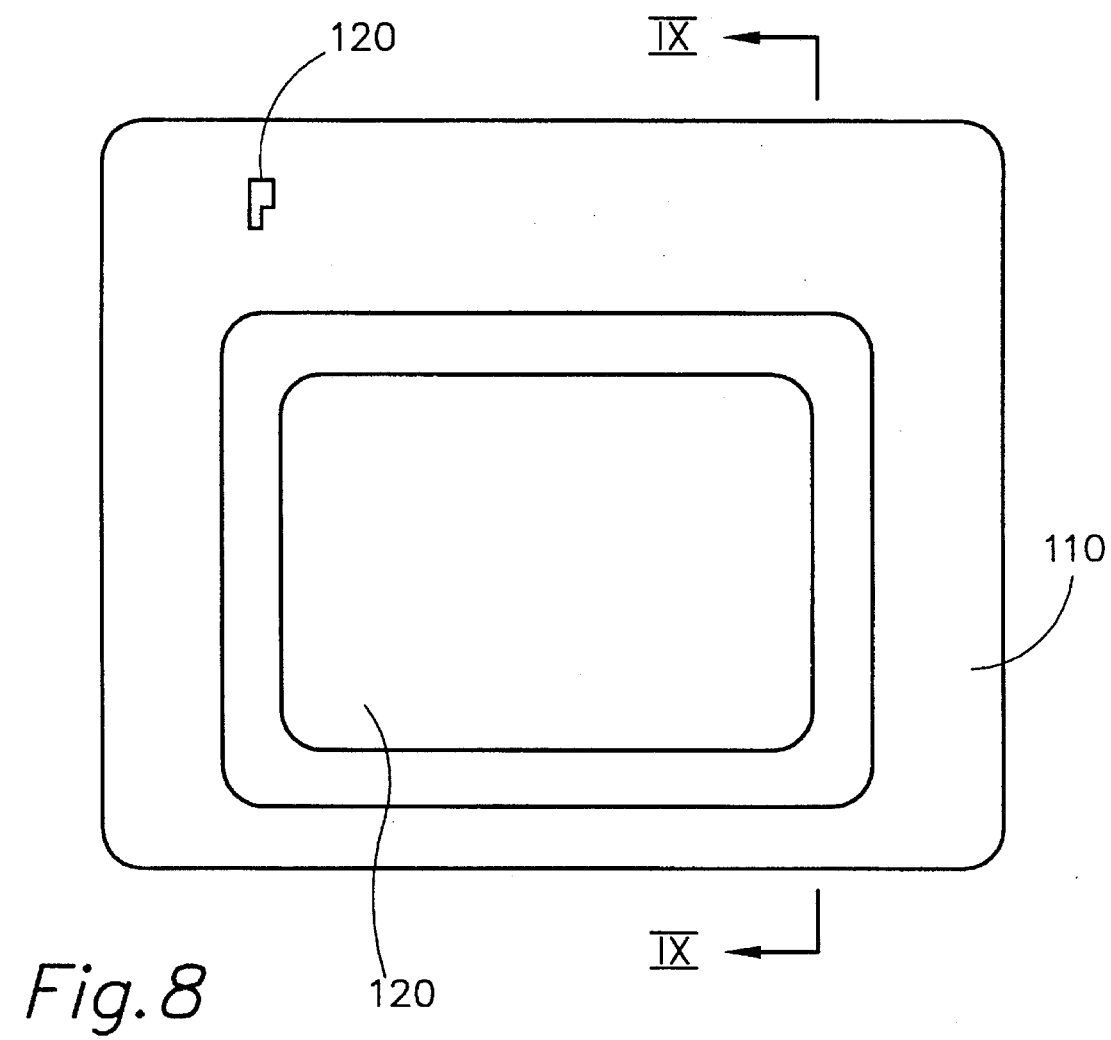
FIG. 8 is a top view of an appliance showing a second embodiment of the present invention.
Figure 9:
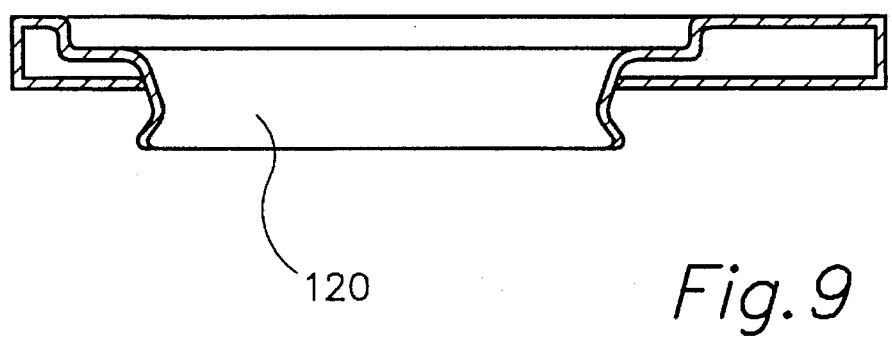
FIG. 9 is a sectional view of FIG. 8.
Figure 10:
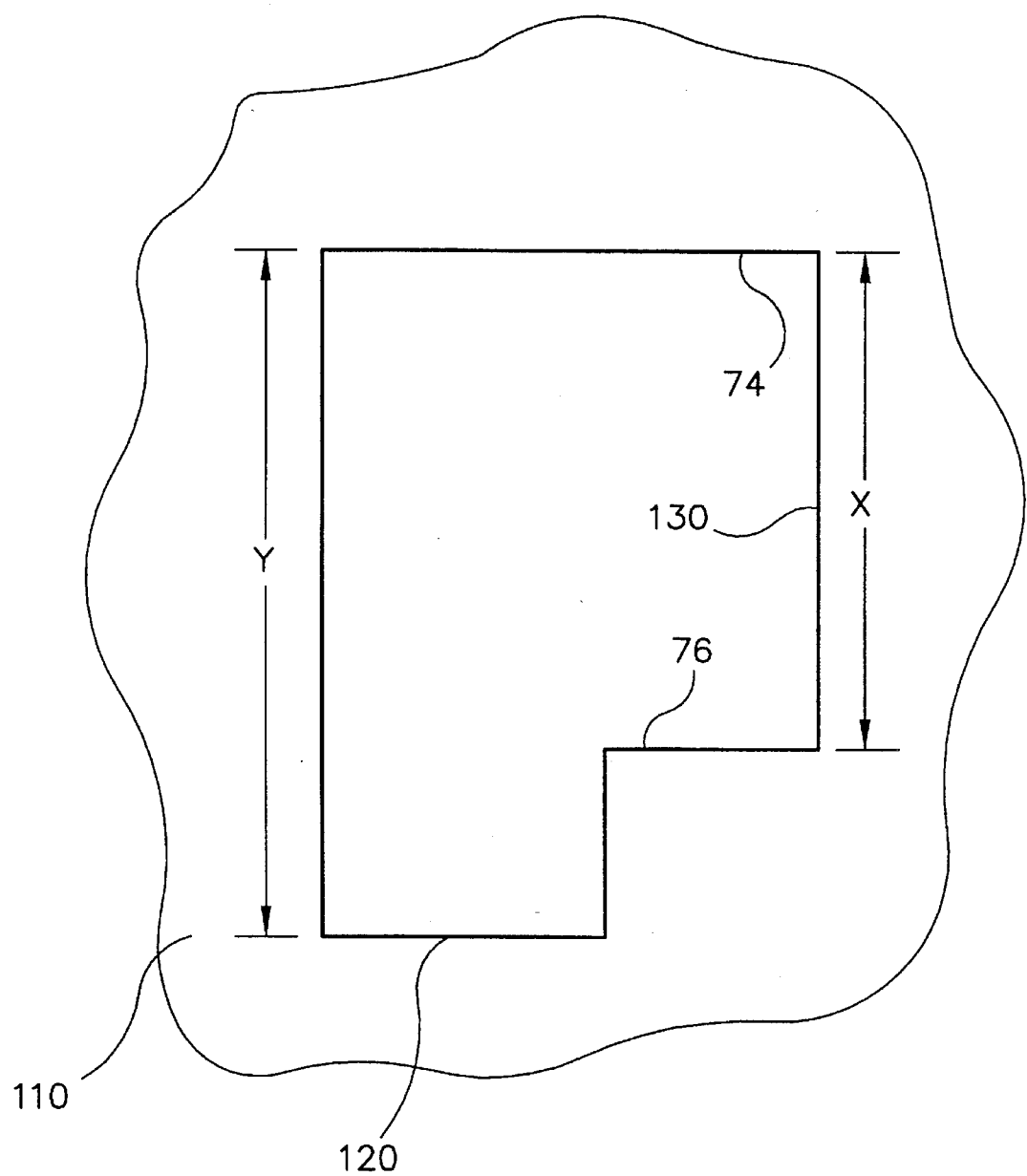
FIG. 10 is an enlarged view of a first opening in the top portion of an appliance as illustrated in FIG. 8.
Figure 11:
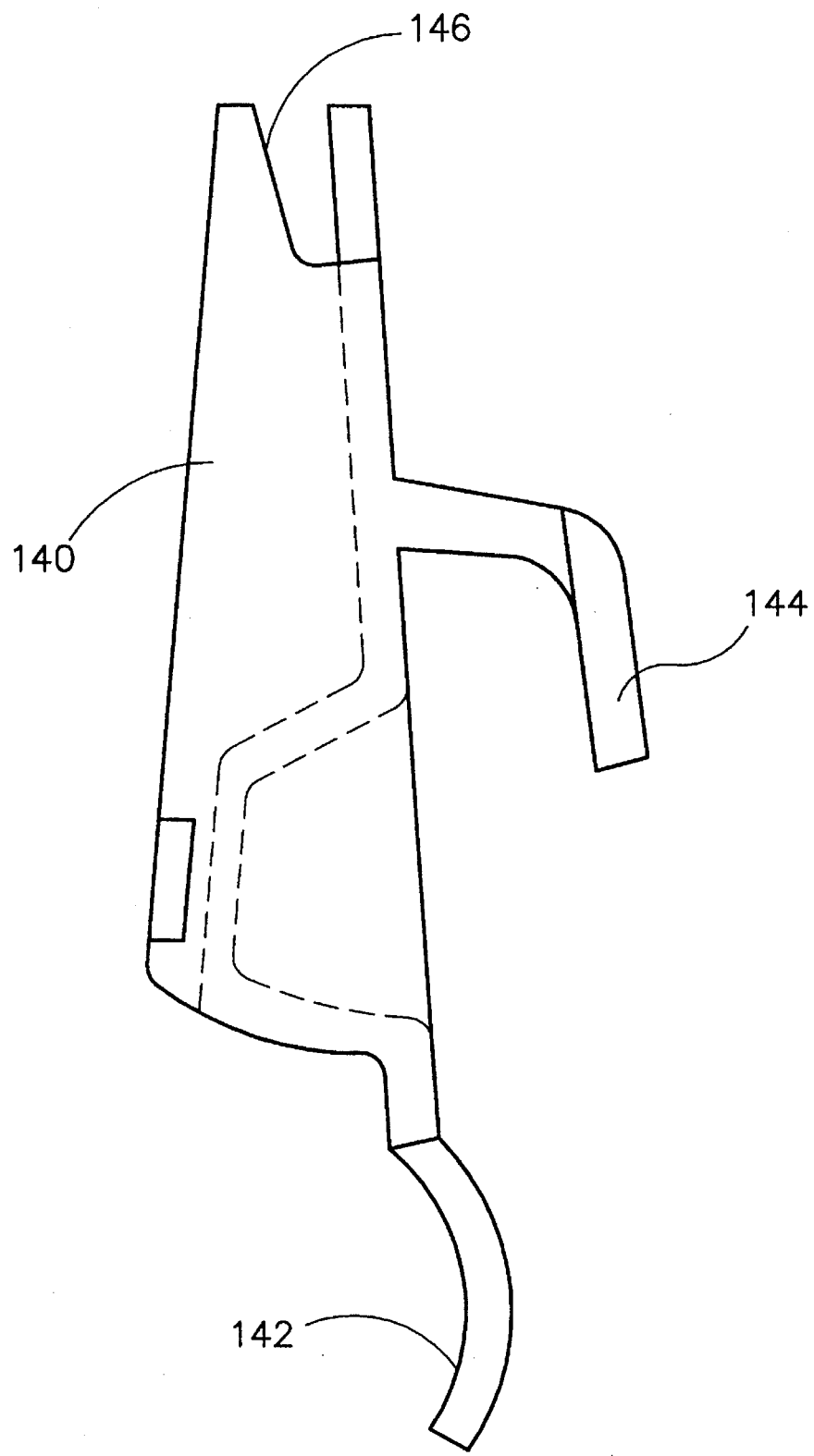
FIG. 11 is a side view of an actuating means that is used in accordance with a second embodiment of the present invention.

In the embodiment described above in conjunction with FIGS. 5, 6 and 7, the second opening 80 operates as the means for rigidly maintaining the switch 30 within the first opening 72 of the first panel 70. In alternative embodiments of the present invention, a second panel 82 is not always required to serve the function of the means for rigidly maintaining the switch within the first opening. An alternative embodiment of the present invention utilizes a first opening 120 that is shaped differently than the first opening 72 described above. FIG. 8 shows a top view of an appliance that has a first opening 120 and an access opening 121 which are a formed through its top surface 110. FIG. 8 does not show a lid, or door, associated with the appliance. FIG. 9 is a sectional view of FIG. 8 that illustrated the formation of the sheet material to define a top access opening 121 that permits access to the appliance. As an example, the appliance can be a washing machine and the opening 121 can be the access through which clothes are deposited into the washing machine and removed therefrom. FIG. 10 shows a section of the top surface 110 of the appliance and the first opening 120. For purposes of understanding the operation of this embodiment of the present invention, the first opening 120 is further described by dimensions X and Y that illustrate two different sizes of portions of the first opening 120. Dimension X is similar in magnitude and function to the distance between the first and second edges, 74 and 76, of the first opening 72 shown in FIGS. 5 and 6. In other words, a first edge 74 and a second edge 76 are provided to be received by the first and second slots, 34 and 38, of the switch 30. The association of the first and second edges and the first and second slots is similar to that described above. Dimension Y shows an enlarged portion of the first opening 120 that provides a clearance region of the first opening 120 into which the switch 30 can be disposed freely without interference by any of the edges of the opening. After the switch 30 is disposed into the larger portion of the first opening 120, the first slot 34 can be aligned with the first edge 74 and the switch can be moved to the right in FIG. 10 until the second edge 76 is received in the second slot 38. When assembled in this manner, the switch 30 can be further pushed toward the right until it moves into contact with the edge 130. In the embodiment described in conjunction with FIG. 10, some means should be provided to prevent the switch 30 from moving back into the larger region of the first opening 120. That function is performed by a device that also serves as the actuating means for the switch. FIG. 11 shows an actuating means 140 that can serve as a means for actuating the switch in response to movement of a component of the apparatus, such as a door or lid, and also serves as a means for rigidly maintaining the switch within the first opening 120. The actuating means 140 is provided with a first extension arm 142 and a second extension arm 144. It also comprises an opening 146 at its end that is shaped to receive the first edge 74 of the larger portion of the first opening 120. The first edge 74 disposed within the opening 146 forms a pivot point about which the actuating means 140 can rotate.

Figure 12:
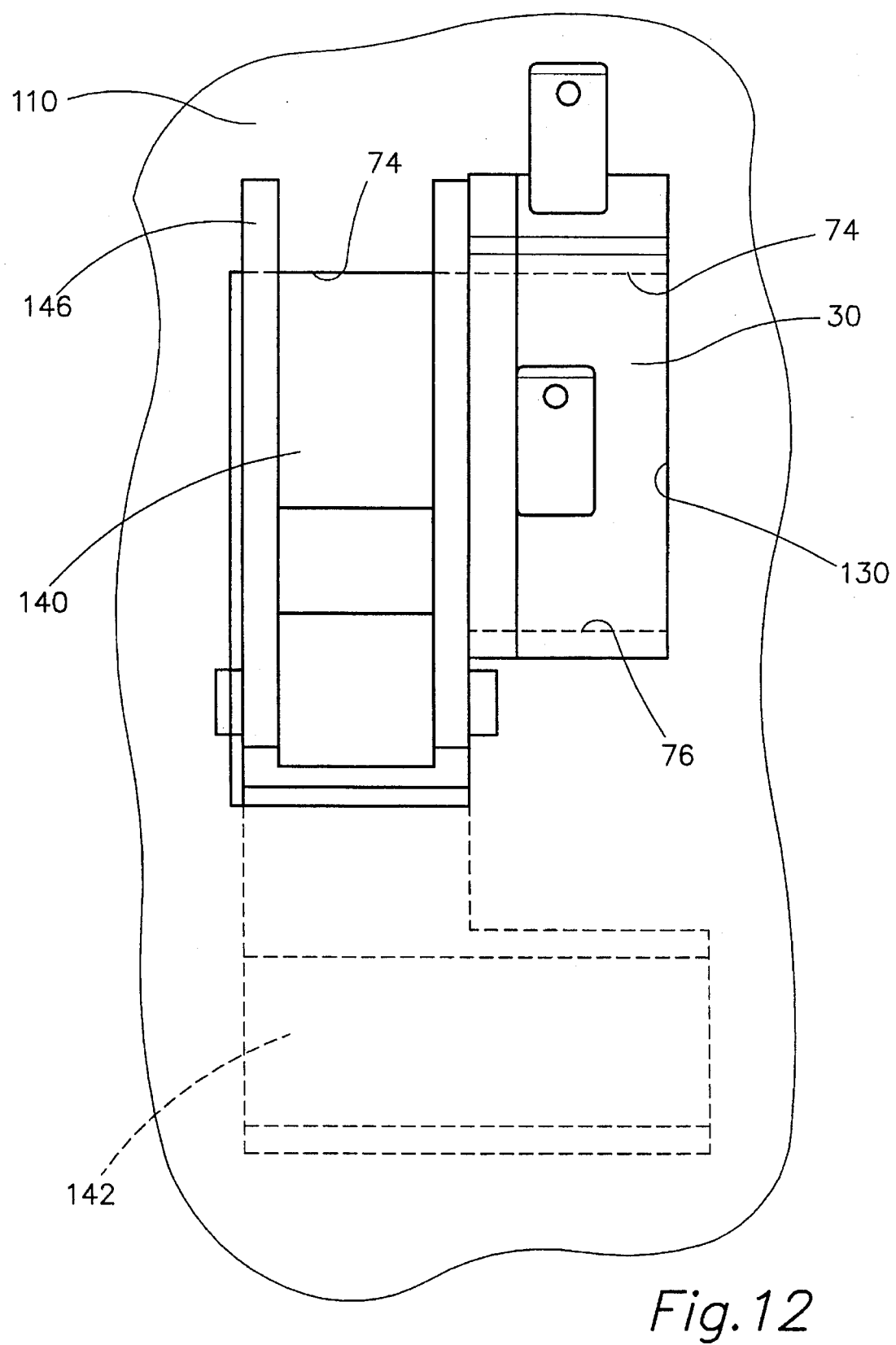
FIG. 12 shows a switch at the actuating means of FIG. 11 assembled into the first opening shown in FIG. 10.

With reference to FIGS. 11 and 12, the actuating means 140 is disposed in the larger region of the first opening 120 with its opening 146 disposed around the first edge 74. The first extension arm 142 is shown in a dashed line representation because it is disposed below the upper surface 110 of the appliance. As will be described in greater detail below in conjunction with FIG. 13, the actuating means 140 pivots in response to movement of a door or lid and thereby depresses the actuator 54 of the switch 30. It also serves a second purpose of preventing the switch 30 from moving toward the left in FIG. 12. If the switch 30 was permitted to move into the larger portion of the first opening 120, it could become disconnected from the sheet material at the first and second edges, 74 and 76, of the first opening 120.

Figure 13:
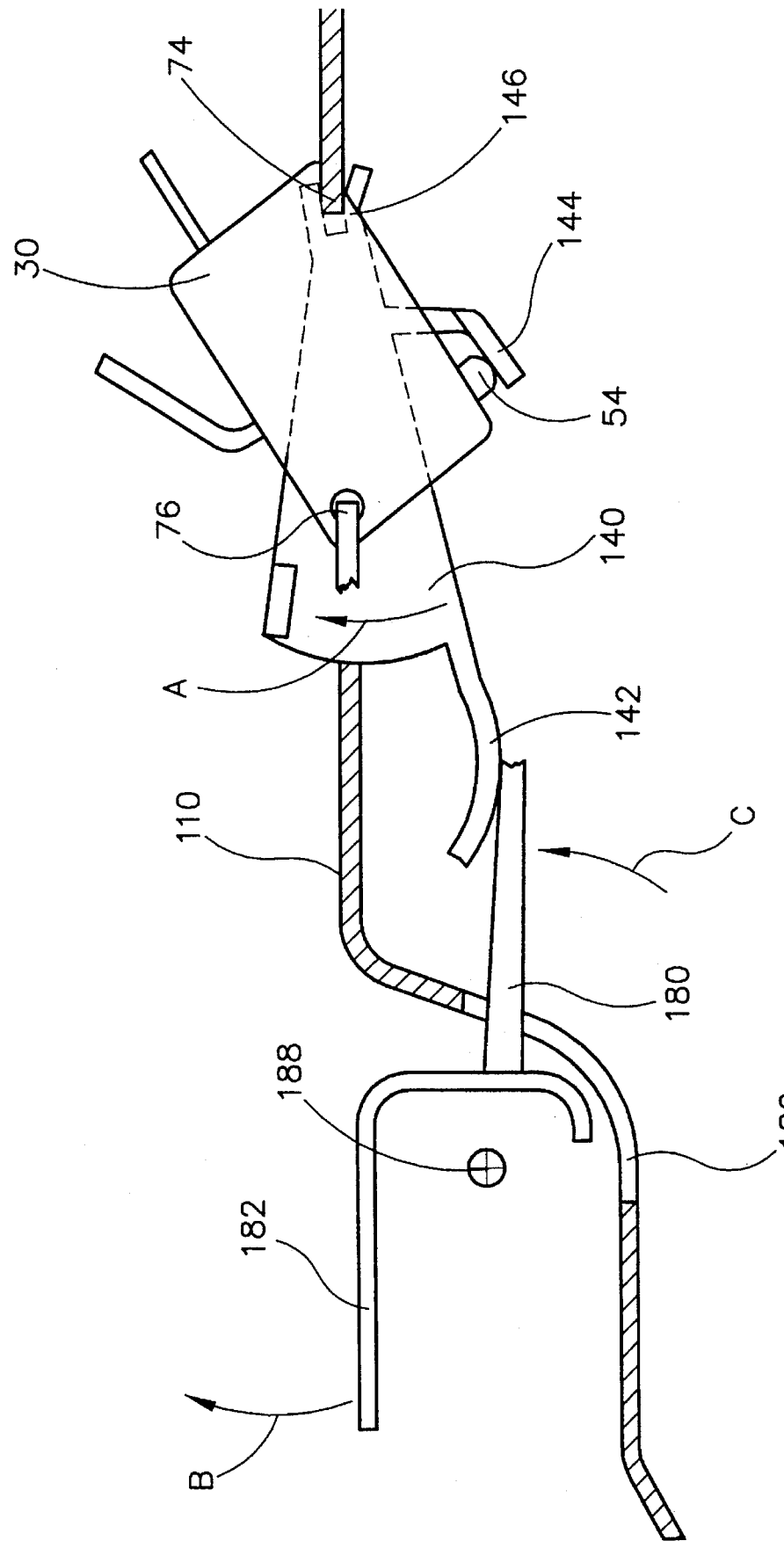
FIG. 13 is a side sectional view of a switch and the actuating means of FIG. 11 assembled within the top portion of an appliance.

FIG. 13 is a side view of the illustration shown in FIG. 12. The actuating means 140 has an opening 146 into which the first edge 74 of the first opening 120 is disposed. This provides a pivot point about which the actuating means 140 can move. This movement is represented by arrow A in FIG. 13. The switch 30 is shown restrained in position by the first and second edges, 74 and 76, of the first opening 120. These first and second edges are disposed in the first and second slots formed in the switch housing 30 as described above. As can be seen in FIG. 13, the particular embodiment illustrated is the second embodiment of the present invention in which the first and second slots are formed proximate opposite corners of the housing structure.

With continued reference to FIG. 13, the first extension arm 142 is disposed in position for actuation by an extension arm 180 that is attached to a lid 182 of the appliance. The extension arm 180 extends through a hole 186 that is formed in the top surface of the appliance. When the lid 182 pivots about a center of rotation 188, and moves in a direction represented by arrow B, extension arm 180 rotates about the center of rotation 188 in a clockwise direction and moves away from the first extension arm 142 of the actuating means 140. This, in turn, allows the actuating means 140 to rotate in a counterclockwise direction about the first edge 74 and the second extension arm 144 moves out of contact with the actuator 54 of the switch 30.

If the lid 182 is closed by moving it in a counterclockwise direction about the center of rotation 188, its extension arm 180 moves in the direction identified by arrow C and into contact with the first extension arm 142 of the actuating means 140. This moves the actuating means 140 in the direction represented by arrow A and also moves the second extension arm 144 into contact with the actuator 54. This movement of the second actuating arm 144 depresses the actuator 54 and actuates the switch to indicate that the door 182 is closed.

As described above, the actuating means 140 serves two purposes in the embodiment illustrated in FIGS. 12 and 13. First, it actuates the switch by depressing the actuator 54 with the second extension arm 144 in response to movement of the first extension arm 142 which is pushed in a clockwise direction about the first edge 74 because the extension arm 180 rotates in a counterclockwise direction about pivot point 188. The second important function that the actuating means 140 serves is to prevent the switch 30 from moving out of its retained position in the smaller region of the first opening 120. As described above, dimension X in FIG. 10 illustrates the distance between the first and second edges, 74 and 76, that fit into the first and second slots of the switch. By occupying the space within the larger region of the first opening 120, the actuating means 140 prevents the switch from moving toward the left in FIG. 12.

With reference to FIGS. 10, 11, 12 and 13, it can be seen that FIG. 12 is a top view of an appliance with the switch 30 and the actuating means 140 attached to it. FIG. 12 is the same view as FIG. 10, except that FIG. 12 has the two components disposed within the first opening 120. FIG. 11 is a side view of one particular design of actuating means 140. FIG. 13 is a side sectional view of the assembly such as that illustrated in FIG. 12 where both the switch 30 and the actuating means 140 are disposed in their operative positions.

Although the present invention has been described with particular specificity to illustrate two preferred embodiments of the present invention, it should be understood that many other embodiments are within its scope.

The embodiments of the invention in which an exclusive property or right is claimed are defined as follows:

1. An apparatus, comprising:

a switch having a housing structure, said housing structure having a top major surface, a bottom major surface, a first edge surface and a second edge surface;

a first slot formed in said housing structure, said first slot extending through said top major surface, said bottom major surface and said first edge surface;

a second slot formed in said housing structure, said second slot extending through said top major surface, said bottom major surface and said second edge surface;

a first panel of said apparatus having a first opening, said first opening being a slot bordered on three sides by said first panel and having a fourth side extending through an edge of said first panel, said first opening being shaped to permit said switch to be slideably inserted into said fourth side of said first opening between two opposite ones of said three sides, said first panel being made of a sheet material having a first thickness, said first and second slots of said housing structure being sized to receive said first thickness of said sheet material at said two opposite ones of said three sides of said opening of said first panel, respectively;

means for maintaining said switch within said first opening of said first panel, said maintaining means comprising a second panel of said apparatus, said second panel having a second opening formed therethrough, said second opening being shaped to receive said housing structure therein and to prevent said housing structure from moving out of said first opening by surrounding said housing structure of said switch with said second opening; and means movable relative to said first and second openings for actuating said switch.

2. The apparatus of claim 1, wherein:

said first and second edge surfaces of said housing structure are parallel to each other and located at opposite ends of said housing structure.

3. The apparatus of claim 1, wherein:

said housing structure is generally a parallelepiped and said first and second edges are located at opposite corners thereof.

4. The apparatus of claim 1, wherein:

said sheet material is sheet metal.

5. The apparatus of claim 1, wherein:

said apparatus is a clothes dryer.

6. The apparatus of claim 1, wherein:

said apparatus is a washing machine.

7. The apparatus of claim 1, wherein:

said apparatus is a dishwasher.

8. The apparatus of claim 1, wherein:

said first panel is a side panel of said apparatus and said second panel is a front panel of said apparatus, said side and front panels being rigidly attached to each other.

* * * * *